United States Patent
Hiruma et al.

(10) Patent No.: US 10,715,569 B2
(45) Date of Patent: Jul. 14, 2020

(54) DELIVERY CONTROL DEVICE AND DELIVERY CONTROL METHOD FOR CONTENT DELIVERY ACCORDING TO ABR DELIVERY METHOD

(71) Applicant: NEC Corporation, Tokyo (JP)

(72) Inventors: Tatsuya Hiruma, Tokyo (JP); Akihiko Uwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 15/573,672

(22) PCT Filed: May 12, 2016

(86) PCT No.: PCT/JP2016/064152
§ 371 (c)(1),
(2) Date: Nov. 13, 2017

(87) PCT Pub. No.: WO2016/185998
PCT Pub. Date: Nov. 24, 2016

(65) Prior Publication Data
US 2018/0152490 A1    May 31, 2018

(30) Foreign Application Priority Data
May 15, 2015   (JP) .................................. 2015-100218

(51) Int. Cl.
*H04L 29/06*    (2006.01)
*H04N 21/2343*  (2011.01)
(Continued)

(52) U.S. Cl.
CPC ...... *H04L 65/4069* (2013.01); *H04L 43/0852* (2013.01); *H04L 65/4084* (2013.01);
(Continued)

(58) Field of Classification Search
CPC ............. H04L 65/4069; H04L 65/4084; H04L 65/605; H04L 65/80; H04L 43/0852;
(Continued)

(56) References Cited

U.S. PATENT DOCUMENTS 5,719,859 A * 2/1998 Kobayashi ........... H04B 7/2659
                                                370/347
6,085,251 A * 7/2000 Fabozzi, II ............ H04L 29/06
                                                709/203
(Continued)

FOREIGN PATENT DOCUMENTS

EP    2773078       9/2014
JP    2000-124916   4/2000
(Continued)

OTHER PUBLICATIONS

Pederson et al., "Enhancing Mobile Video Capacity and Quality USing Rate Adaption, RAN Caching and Processing", May 2015, IEEE/ACM Transactions on Networking, IEEE Publlishing.*
(Continued)

*Primary Examiner* — Todd L Barker
(74) *Attorney, Agent, or Firm* — Young & Thompson

(57) ABSTRACT

A delivery control device, which is installed in repeater equipment interposed between a content delivery server device and a client device so as to repeat delivered contents, controls delivery speed for contents by adopting pacing delivery depending on delayed conditions of networks and the operating condition of the client device according to the ABR (Adaptive Bit Rate) delivery method. The delivery control device includes a delivery speed calculation part configured to calculate real delivery speed for sequentially delivering the divided files, which are produced by dividing file data representing contents to be delivered to a client device, in an order of reproducing contents, and a delivery speed determination part configured to determine delivery
(Continued)

| | | DELIVERY SPEED(bps) | |
|---|---|---|---|
| | | REAL DELIVERY SPEED≧PRESUMED DELIVERY SPEED | REAL DELIVERY SPEED<PRESUMED DELIVERY SPEED |
| TS-FILE RECEPTION INTERVAL (MILLISECOND) | TS-FILE RECEPTION INTERVAL< LOWER-LIMIT THRESHOLD | FULL SPEED DELIVERY (INITIAL BUFFER/TRICK PLAY DETECTION) | FULL SPEED DELIVERY (INITIAL BUFFER/TRICK PLAY DETECTION) |
| | LOWER-LIMIT THRESHOLD≦ TS-FILE RECEPTION INTERVAL≦ UPPER-LIMIT THRESHOLD | PACING DELIVERY | FULL SPEED DELIVERY (N/W DELAY DETECTION) |
| | TS-FILE RECEPTION INTERVAL> UPPER-LIMIT THRESHOLD | FULL SPEED DELIVERY (N/W DELAY DETECTION) | FULL SPEED DELIVERY (N/W DELAY DETECTION) |
| INITIAL TS-FILE DELIVERY | | FULL SPEED DELIVERY | | speed for the divided files based on the real delivery speed calculated by the delivery speed calculation part, the presumed delivery speed determined in advance, and predetermined thresholds relating to intervals of receiving the divided files.

20 Claims, 6 Drawing Sheets

(51) Int. Cl.
    *H04N 21/647*     (2011.01)
    *H04N 21/6587*     (2011.01)
    *H04N 21/845*     (2011.01)
    *H04L 12/26*     (2006.01)
    *G06F 16/178*     (2019.01)
    *G06F 16/174*     (2019.01)

(52) U.S. Cl.
    CPC ............ *H04L 65/605* (2013.01); *H04L 65/80* (2013.01); *H04N 21/23439* (2013.01); *H04N 21/64738* (2013.01); *H04N 21/64792* (2013.01); *H04N 21/6587* (2013.01); *H04N 21/8456* (2013.01); *G06F 16/178* (2019.01); *G06F 16/1748* (2019.01)

(58) Field of Classification Search
    CPC ....... H04N 21/23439; H04N 21/64738; H04N 21/64792; H04N 21/6587; H04N 21/8456; G06F 16/1748; G06F 16/178
    See application file for complete search history.

(56) References Cited

U.S. PATENT DOCUMENTS

| | | | | |
|---|---|---|---|---|
| 8,712,353 | B2* | 4/2014 | Mueck | H04W 88/06 |
| | | | | 455/137 |
| 10,063,651 | B2* | 8/2018 | Carter | H04L 67/2842 |
| 2003/0083870 | A1 | 5/2003 | Lee et al. | |
| 2010/0142447 | A1* | 6/2010 | Schlicht | H04W 24/02 |
| | | | | 370/328 |
| 2010/0248763 | A1* | 9/2010 | Aaron | H04W 28/22 |
| | | | | 455/509 |
| 2010/0329118 | A1* | 12/2010 | Adams | H04L 47/10 |
| | | | | 370/235 |
| 2011/0082924 | A1 | 4/2011 | Gopalakrishnan | |
| 2013/0332620 | A1 | 12/2013 | Gahm et al. | |
| 2014/0136645 | A1 | 5/2014 | Ozawa | |
| 2014/0281000 | A1 | 9/2014 | Dattagupta et al. | |
| 2014/0344414 | A1 | 11/2014 | Ozawa | |
| 2014/0379873 | A1 | 12/2014 | Biderman et al. | |
| 2015/0074285 | A1 | 3/2015 | Gahm et al. | |
| 2015/0229701 | A1* | 8/2015 | Bumroongpongse | ... H04L 67/06 |
| | | | | 709/219 |
| 2016/0165309 | A1* | 6/2016 | Van Brandenburg | ........................ |
| | | | | H04N 21/4728 |
| | | | | 725/116 |
| 2016/0359972 | A1* | 12/2016 | Calkowski | .............. H04L 67/06 |
| 2019/0158933 | A1* | 5/2019 | Ouedraogo | ...... H04N 21/64322 |
| 2019/0349453 | A1* | 11/2019 | Phillips | ................ H04L 67/303 |

FOREIGN PATENT DOCUMENTS

| | | |
|---|---|---|
| JP | 2012-070440 | 4/2012 |
| JP | 2014-534489 | 12/2014 |
| WO | WO2011/108868 | 9/2011 |
| WO | WO2013/005761 | 1/2013 |
| WO | WO2013/042639 | 3/2013 |
| WO | WO2014/074033 | 5/2014 |

OTHER PUBLICATIONS

Liu et al., "Deriving and Validating User Experience Model for DASH Video Streaming", Aug. 2015, IEEE Transactions on Broadcasting, IEEE Publishing.*
International Search Report, PCT/JP2016/064152, dated Aug. 2, 2016.
Apple Computer Inc., "Overview of HTTP Live Streaming", Online, retrievaled on Apr. 24, 2015, Internet, <URL:https://developer.apple.com/jp/documentation/StreamingMediaGuide.pdf>.
Oyman, O., et al_, "Quality of Experience for HTTP Adaptive Streaming Services", IEEE Communications Magazine, 2012. 04, vol. 50, No. 4, pp. 20 to 27.
Kozo Satoda et al., "Adaptive streaming proxy using video pacing" Proceedings of the 2012 IEICE Communications Society Conference vol. 2, The Institute of Electronics, Information and Communication Engineers, Aug. 28, 2012, 69 page, ISSN:1349-1415.
Kozo Satoda et al., "Network Traffic Estimation and Prediction Technologies for Improving User-perceived Quality", IEICE Technical Report, The Institute of Electronics, Information and Communication Engineers, Nov. 7, 2013, vol. 113, No. 293, 29-34 pages, ISSN:0913-5685.
Notice of Allowance dated Jan. 22, 2019, in Japanese Patent Application No. 2015-100218, with English translation provided.
Supplementary European Search Report dated Oct. 30, 2018 in corresponding European Patent Application No. 16796391.7.

* cited by examiner

FIG. 2

(a)
sample-pl.m3u8

```
#EXT-X-VERSION:3
#EXTM3U
#EXT-X-TARGETDURATION:10
#EXT-X-MEDIA-SEQUENCE:1
# Old-style integer duration;avoid for newer clients.
#EXTINF:10,
http://xxxx.xxxx.xxxx/sample0.ts
# New-style floating-point duration;use for modern clients.
#EXTINF:10.0,
http://xxxx.xxxx.xxxx/sample1.ts
#EXTINF:10.0,
http://xxxx.xxxx.xxxx/sample2.ts
#EXT-X-ENDLIST
```

(b)
sample-vpl.m3u8

```
#EXTM3U
#EXT-X-STREAM-INF:PROGRAM-ID=1,BANDWIDTH=200000,RESOLUTION=720x480
http://xxxx.xxxx.xxxx/lo-a/sample-pl.m3u8
#EXT-X-STREAM-INF:PROGRAM-ID=1,BANDWIDTH=200000,RESOLUTION=720x480
http://xxxx.xxxx.xxxx/lo-b/sample-pl.m3u8
#EXT-X-STREAM-INF:PROGRAM-ID=1,BANDWIDTH=500000,RESOLUTION=1920x1080
http://xxxx.xxxx.xxxx/md-a/sample-pl.m3u8
#EXT-X-STREAM-INF:PROGRAM-ID=1,BANDWIDTH=500000,RESOLUTION=1920x1080
http://xxxx.xxxx.xxxx/md-b/sample-pl.m3u8
```

FIG. 5

| | | DELIVERY SPEED (bps) | |
|---|---|---|---|
| | | REAL DELIVERY SPEED ≥ PRESUMED DELIVERY SPEED | REAL DELIVERY SPEED < PRESUMED DELIVERY SPEED |
| TS-FILE RECEPTION INTERVAL (MILLISECOND) | TS-FILE RECEPTION INTERVAL < LOWER-LIMIT THRESHOLD | FULL SPEED DELIVERY (INITIAL BUFFER/TRICK PLAY DETECTION) | FULL SPEED DELIVERY (INITIAL BUFFER/TRICK PLAY DETECTION) |
| | LOWER-LIMIT THRESHOLD ≤ TS-FILE RECEPTION INTERVAL ≤ UPPER-LIMIT THRESHOLD | PACING DELIVERY | FULL SPEED DELIVERY (N/W DELAY DETECTION) |
| | TS-FILE RECEPTION INTERVAL > UPPER-LIMIT THRESHOLD | FULL SPEED DELIVERY (N/W DELAY DETECTION) | FULL SPEED DELIVERY (N/W DELAY DETECTION) |
| | INITIAL TS-FILE DELIVERY | FULL SPEED DELIVERY | |

# DELIVERY CONTROL DEVICE AND DELIVERY CONTROL METHOD FOR CONTENT DELIVERY ACCORDING TO ABR DELIVERY METHOD

TECHNICAL FIELD

The present invention relates to a delivery control device and a delivery control method for controlling delivery speed between a client device and a content delivery server device according to an ABR (Adaptive Bit Rate) delivery method.

The present application claims the benefit of priority on Japanese Patent Application No. 2015-100218 filed on May 15, 2015, the subject matter of which is hereby incorporated herein by reference.

BACKGROUND ART

Conventionally, technologies have been developed with respect to bandwidth control in content delivery. For example, Patent Literature 1 discloses a bandwidth control method in content delivery. Patent Literatures 2 and 3 disclose cache servers for preventing a reduction of user QoE due to variations of bands in content delivery through mobile networks. Patent Literature 4 discloses a server device that transmits to a client device media data encrypting contents at a single media rate selected from among multiple media rates. Patent Literature 5 discloses a transmission band delivery method for delivering transmission bands depending on the priority for each connection when distributing bands (e.g. ABR (Available Bit Rate) bands) between multiple connections. Patent Literature 6 discloses an ABR (Available Bit Rate) service quality estimation device.

Recently, according to the advancement of Internet technologies, electronic devices having communication functions have been connected to networks, in particularly, communication traffic has increased due to the spreading of mobile terminal devices and smartphones; this nay increase the burden of loads to network facilities of common carriers. For this reason, various studies have been made to improve client QoE (Quality of Experience) without causing higher traffic than necessary. For example, it is necessary to control traffic for content delivery according to the recently-developed ABR (Adaptive Bit Rate) delivery method.

The ABR delivery method is used for delivering contents such as moving pictures and sounds. Non-Patent Literature 1 teaches HTTP Live Streaming (HLS) as one example of the ABR delivery method. According to the content delivery of HLS, a single content is divided into multiple segments, and therefore their segment files are delivered to a client device. The RLS provides a playlist file (or an index file) describing URLs (Uniform Resource Locators) of segment files for a single content in an order of playback times and multiple types of segment files having different bit rates for a single content, and therefore it uses a variant playlist (Variant Playlist) describing the URL of a playlist corresponding to each bit rate. First, a client device acquires a variant playlist so as to select a playlist file, corresponding to the bit rate suited to viewing environments, from among playlist files described therein. Then, the client device sequentially retrieves segment files described in the selected playlist file so as to reproduce contents.

To delivery contents such as video and audio contents, a pacing (Pacing) delivery technology has been developed as a method for suppressing network traffic without sacrificing reproduction quality at client devices. For example, Patent Literature 1 teaches a pacing delivery control device adapted to a gateway device located between a client device and a content delivery server device according to the ABR delivery method. The pacing delivery control device retrieves bitrate information used for delivering contents from a playlist file corresponding to the contents to be delivered to a client device, thus controlling bandwidths allocated to the client device depending on a target bitrate set to the client device. This makes it possible for the client device to guarantee the target bitrate. In addition, it is possible to prevent the occurrence of burst traffic due to usage of the entire bandwidth for the client device in networks including a content delivery server device, a gateway device, and a client device.

CITATION LIST

Patent Literature

Patent Literature 1: Japanese Patent Publication No. 2014-534489
Patent Literature 2: WO 2013/042639
Patent Literature 3: WO 2013/005761
Patent Literature 4: WO 2011/108868
Patent Literature 5: Japanese Patent Application Publication No. 2012-070440
Patent Literature 6: Japanese Patent Application Publication No. 2000-124916

Non-Patent Literature

Non-Patent Literature 1: Apple Computer Inc., "Outline of HTTP Live Streaming", <URL: https://developer.apple.com/jp/documentation/StreamingMedia Guide.pdf>

SUMMARY OF INVENTION

Technical Problem

The pacing delivery method is generally provided to carry out pacing for delivering a single file which is not divided with respect to a single content, however, it does not provide any scheme for regarding each divided segment file as part of a single content, and therefore it cannot carry out pacing over the entirety of each content. According to Patent Literature 1, a control device adapted to a gateway device is unable to detect the buffered state of segment files in a client device, and therefore the client device may undergo an increasing wait time of playback and suspension of playback, indicating a possibility that traffic cannot be reduced in networks as expected. In addition, the HLS may determine which bit rate be selected from a variant playlist file dependent upon the operation of a client device, and therefore bands of networks would be greatly consumed by requesting contents having a higher bit rate than necessary.

The present invention is made in consideration of the aforementioned problem, and therefore the present invention aims to provide a delivery control device and a delivery control method for content delivery according to the ABR delivery method.

Solution to Problem

A first aspect of the present invention is directed to a delivery control device, which includes a delivery speed calculation part configured to calculate real delivery speed for sequentially delivering the divided files, which are produced by dividing file data representing contents to be delivered to a client device, in an order of reproducing contents, and a delivery speed determination part configured to determine delivery speed for the divided files based on the real delivery speed calculated by the delivery speed calculation part, the presumed delivery speed determined in advance, and predetermined thresholds relating to intervals of receiving the divided files.

A second aspect of the present invention is directed to repeater equipment, which is interposed between a content delivery server device for delivering contents and a client device for receiving contents, includes a delivery control device configured to control delivery speed for repeating contents.

A third aspect of the present invention is directed to a content delivery system which includes a content delivery server device for delivering contents, a client device for receiving contents, and repeater equipment, which is interposed between the content delivery server device and the client device, and which includes a delivery control device configured to control delivery speed for repeating contents.

A fourth aspect of the present invention is directed to a delivery control method including the steps of: calculating real delivery speed for sequentially delivering the divided files, which are produced by dividing file data representing contents to be delivered to a client device, in an order of reproducing contents; and determining delivery speed for the divided files based on the calculated real delivery speed, the presumed delivery speed determined in advance, and predetermined thresholds relating to intervals of receiving the divided files.

A fifth aspect of the present invention is directed to a program causing a compute to execute a first process for calculating real delivery speed for sequentially delivering the divided files, which are produced by dividing file data representing contents to be delivered to a client device, in an order of reproducing contents, and a second process for determining delivery speed for the divided files based on the calculated real delivery speed, the presumed delivery speed determined in advance, and predetermined thresholds relating to intervals of receiving the divided files.

Advantageous Effects of Invention

According to the present invention, it is possible to achieve content delivery according to the ABR (Adaptive Bit Rate) delivery method depending on delayed conditions of networks and operating conditions of client devices.

BRIEF DESCRIPTION OF DRAWINGS

FIG. 2 shows file configurations representing examples of playlist files used for the content delivery system.

FIG. 5 is a table used to explain a method of determining delivery speed with the delivery control device of the repeater equipment.

DESCRIPTION OF EMBODIMENT

The present invention concerning the delivery control device and the delivery control method for content delivery according to the ABR delivery method will be described in detail by way of examples with reference to the accompanying drawings.

Figure 1:
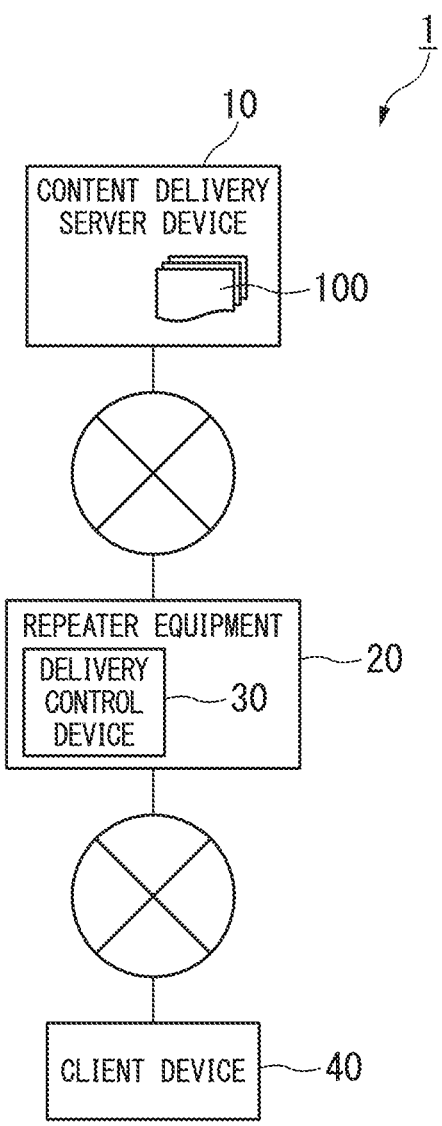
FIG. 1 is a schematic diagram of a content delivery system adapting the present invention.

FIG. 1 is a schematic diagram of a content delivery system 1 adopting the present invention. The content delivery system 1 includes a content delivery server device 10, repeater equipment 20, and a client device 40. The content delivery server device 10 delivers contents such as moving pictures and sounds according to the ABR delivery method. The content delivery server device 10 has an HLS (HTTP Live Streaming) function, and therefore a Web server delivers divided files (i.e. TS (Transport Stream) files 100) which are obtained by dividing file data of contents to be delivered. The HLS can deliver TS files 100 at different bitrates. The content delivery server device 10 delivers TS files 100 corresponding to the bitrate as requested by the client device 40. Herein, the bitrate indicates the amount of data (i.e. number of bits for each second) to be transferred for each unit time. The bitrate of the TS files 100 represents the reproduction quality of contents because it is possible to reproduce moving pictures and sounds at high quality by transferring and processing numerous amounts of information. The repeater equipment 20 transfers to the client device 40 TS files delivered by the content delivery server device 10. The repeater equipment 20 includes a delivery control device 30 (i.e. a control device according to the present invention). The delivery control device 30 determines the delivery speed of TS files 100 to be transferred to the client device 40. The client device 40 reproduces contents upon receiving TS files 100, delivered by the content delivery server device 10, through the repeater equipment 20. For example, the client device 40 is a personal computer (PC) or a mobile terminal device such as a smartphone. The content delivery server device 10 and the repeater equipment 20 are connected together in a communication-enabled manner through networks such as the Internet. The repeater equipment 20 and the client device 40 are connected together in a communication-enabled manner through networks such as local networks and mobile phone networks.

FIG. 2 shows examples of playlist files used for the content delivery system 1. It illustrates two playlists, i.e. "sample-p1.m3u8" (FIG. 2(*a*)) and "sample-vp1.m3u8" (FIG. 2(*b*)). Herein, ".m3u8" is an extended format for the ".m3u" format used for MP3 playlists.

FIG. 2(*a*) shows an example of a playlist file (or an index file) used for the HLS (hereinafter, "playlist file" will be referred to as "PL file"). The PL file "sample-p1.m3u8" shown in FIG. 2(*a*) includes URLs (i.e. retrieval locations) of TS files "sample0.ts", "sample1.ts", and "sample2.ts" and their playback times (e.g. 10 seconds) of TS files.

FIG. 2(*b*) shows an example of a variant playlist file used for the HLS (hereinafter, "variant playlist file" will be referred to as "VPL file"). The VPL file "sample-vp1.m3u8" shown in FIG. 2(*b*) describes URLs for the PL file "sample-p1.m3u8" corresponding to TS files having different bitrates. As URLs of PL files corresponding to TS files having low bitrates, for example, it describes http://xxxx.xxxx.xxxx/lo-a/sample-p1.m3u8 and http://xxxx.xxxx.xxxx/1o-b/sample-p1.m3u8. The two URLs indicate primary and backup.

For example, the content delivery server device 10 stores multiple TS files, which are produced by dividing a data file for a single content α, for multiple bitrates. For example, there are provided three types of bitrates such as "high", "intermediate", and "low". The content delivery server device 10 stores "sample0.ts" through "sample2.ts" corresponding to a high bitrate, "sample0.ts" through "sample2.ts" corresponding to an intermediate bitrate, and "sample0.ts" through "sample2.ts" corresponding to a low bitrate.

In addition, the content delivery server device 10 stores PL files for each bitrate. Each PL file includes URLs of TS files having the bitrate corresponding to the PL file. For example, the PL file corresponding to the high bitrate includes URLs of "sample0.ts" through "sample2.ts" corresponding to the high bitrate. The same thing can be said to the intermediate bitrate and the low bitrate. Moreover, the content delivery server device 10 VPL files indicating URLs of PL files corresponding to multiple bitrates.

The content deliver server device 10 includes a Web server that can deliver the foregoing TS files, PL files, and VPL files. The client device 40 receives a VPL file so that software (or a reproduction player) may selects an appropriate bitrate. The client device 40 receives PL files corresponding to the bitrate selected by the reproduction player from the content deliver server device 10 so as to sequentially download TS files by accessing URLs described in PL files. The reproduction player reproduces downloaded TS files.

The above is the outline of a content delivery operation in the HLS. Herein, the client device 40 determines which bitrate be selected to read the corresponding PL files from the VPL file dependent on the setting of the client device 40. For this reason, a request for downloading TS files having a higher bitrate than necessary would greatly consume bands in networks, and therefore it may incur the possibility of causing drawbacks such as suspension of contents being reproduced. In addition, no conventional technology has provided a technology of achieving pacing delivery depending on TS files requested by the client device 40. The present invention is characterized by providing the delivery control device 30 within the repeater equipment 20 in order to solve the above problem.

Figure 3:
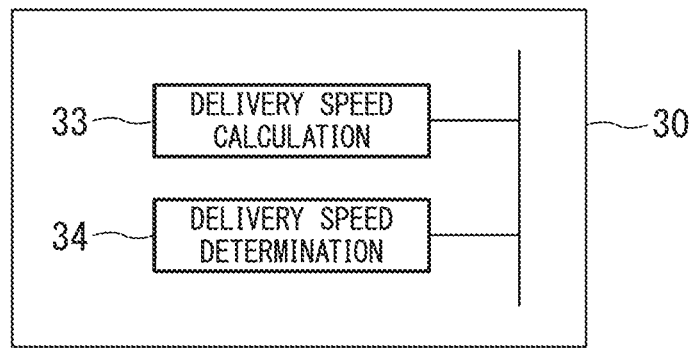
FIG. 3 is a block diagram showing the minimum configuration of a delivery control device included in repeater equipment in the content delivery system.

Next, the delivery control device 30 equivalent to the control device according to the embodiment of the present invention will be described in detail. FIG. 3 is a block diagram showing the minimum configuration of the delivery control device 30. The delivery control device 30 includes a deliver speed calculation part 33 and a delivery speed determination part 34. The delivery speed calculation part 33 calculates real delivery speed for TS files. The delivery speed determination part 34 determines delivery speed for TS files based on the real delivery speed for TS files, presumed delivery speed for TS files which is determined in advance, and thresholds relating to intervals of reception.

Figure 4:
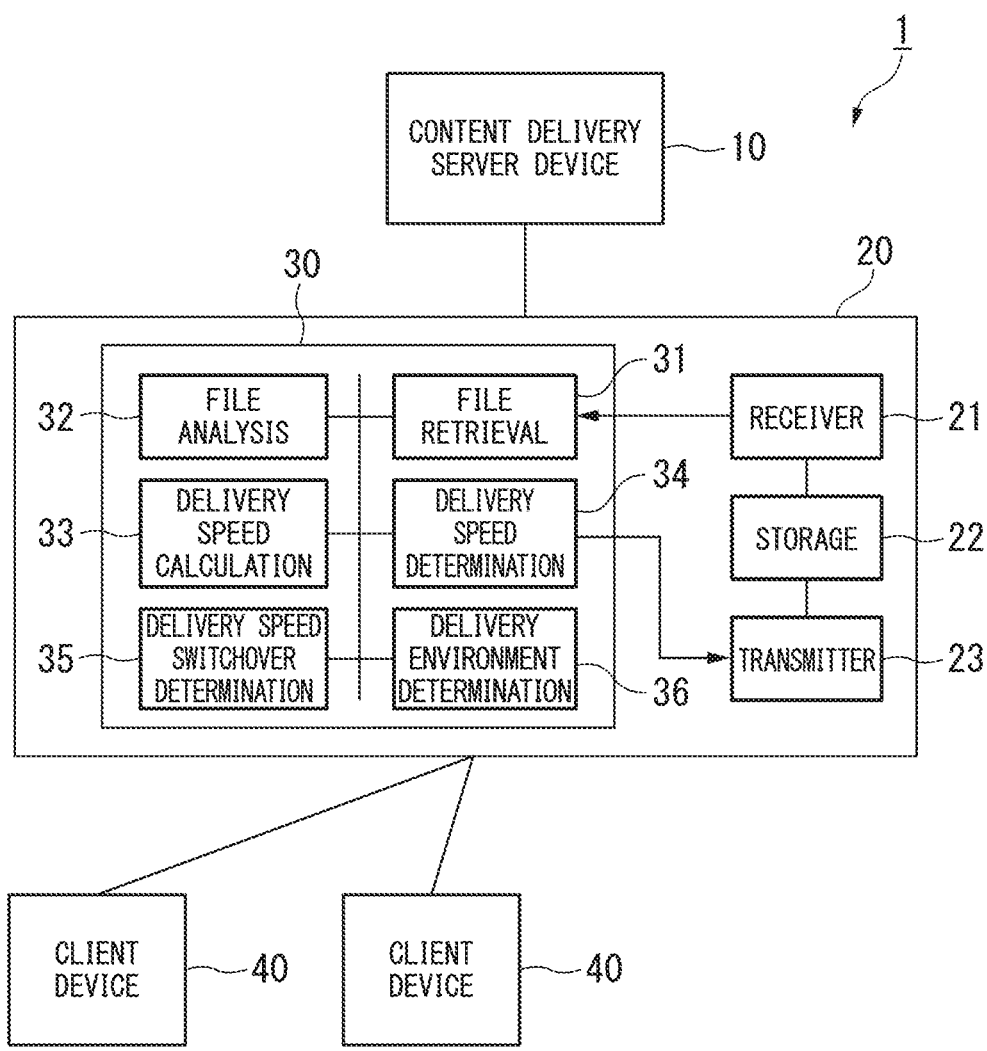
FIG. 4 is a block diagram showing the detailed configuration of the delivery control device and the repeater equipment in the content delivery system.

FIG. 4 is a block diagram showing the detailed configurations of the delivery control device 30 and the repeater equipment 20 in the content delivery system 1. The repeater equipment 20 includes a receiver 21, a storage unit 22, and a transmitter 23. The receiver 21 receives a content delivery request from the client device 40. In addition, the receiver 21 receives PL files, VPL files, and TS files delivered by the content delivery server device 10. The storage unit 22 temporarily saves (or buffers) TS files received with the receiver 21. The transmitter 23 transmits to the content delivery server device 10 the content delivery request from the client device 40. The transmitter 23 transmits PL files, VPL files, and TS files, received with the receiver 21, to the client device 40.

The delivery control device 30 includes a file retrieval part 31, a file analysis part 32, the delivery speed calculation part 33, the delivery speed determination part 34, a deliver speed switchover determination part 35, and a delivery environment determination part 36. The file retrieval part 31 retrieves PL files, VPL files, and TS files received with the receiver 21 so as to send those files to the file analysis part 32. The file analysis part 32 analyzes various types of files retrieved by the file retrieval part 31 so as to identify which of PL files, VPL files, and TS files matches the retrieved files, and then each of files will be subjected to processing as necessary.

In the delivery control device 30, the delivery speed calculation part 33 and the delivery speed determination part 34 have been described above in terms of their operations. The delivery speed switchover determination part 35 determines whether PL files represent an audio content or a moving-picture content. The delivery environment determination part 36 determines network environments concerning content delivery and operating conditions of the client device 40 based on the real delivery speed of TS files, the presumed delivery speed, and the thresholds concerning intervals of reception.

FIG. 5 is a table used to explain a method of determining delivery speed with the delivery control device 30. The present embodiment determines operating conditions for the client device 40 or networks concerning content delivery so as to deliver TS files at delivery speed depending on the intermittent status of delivery environments and depending on the requested bitrate. Thus, it is possible to achieve pacing distribution according to the ABR delivery method for transmitting divided files. The method how to calculate delivery speed will be described below.

<Parameter Calculations>

First, the delivery speed calculation part 33 calculates real delivery speed based on file sizes of TS files actually delivered and times used for delivery. Specifically, the delivery speed calculation part 33 calculates the real delivery speed by equation (1).

$$\text{Real delivery speed (bps)} = \text{file size of TS file (byte)} \div \text{elapsed time of delivery (ms)} \times 8{,}000 \quad (1)$$

Next, the delivery speed calculation part 33 calculates a lower-limit threshold, an upper-limit threshold, and presumed delivery speed. The lower-limit threshold is defined as a threshold used to prevent pacing delivery by use of a reduction in intervals of reception for TS files due to an operation of the client device 40 for buffering a certain amount of TS files at a start timing of viewing contents (e.g. an initial buffer timing) or at a trick play mode (i.e. an operation of making a jump on the reproduction position). The upper-limit threshold is defined as a threshold used to determine any delay occurring in networks in consideration of a reduction in intervals of reception for TS files due to delays in networks or delays in reproduction processes of the client device 40. The presumed delivery speed is defined as a threshold used to determine whether any delay occurs in networks in comparison with the real delivery speed of TS files.

The delivery speed calculation part 33 calculates the lower-limit threshold by equation (2).

$$\text{Lower-limit threshold} = \text{reproduction time of TS file (ms)} \times \text{safety factor of lower-limit threshold} \quad (2)$$

Herein, the reproduction time of TS files refers to a set value of reproduction time for TS files described in PL files. In FIG. 2(a), it is set to "10,000 ms (i.e. 10 seconds)". For example, the safety factor of the lower-limit threshold is set to "0.8".

The delivery speed calculation part 33 calculates an upper-limit threshold by equation (3).

$$\text{Upper-limit threshold} = \text{reproduction time of TS file (ms)} \times \text{safety factor of upper-limit threshold} \quad (3)$$

The reproduction time of TS files refers to a set value of the reproduction time of TS files described in PL files. For example, the safety factor of the upper-limit threshold is set to "1.2".

The delivery speed calculation part 33 calculates the presumed delivery speed by equation (4).

$$\text{Presumed delivery speed} = \text{pacing delivery speed (bps)} \times \text{safety factor of delivery speed} \quad (4)$$

Herein, the pacing delivery speed refers to delivery speed of TS files determined by the delivery speed determination part 34. The method of calculating pacing delivery speed will be discussed later. For example, the safety factor of the delivery speed is set to a value ranging from "0.8" to "1.2". For example, the upper-limit value and the lower-limit value for the safety factor of the delivery speed are set by an operator who handles the repeater equipment 20.

The delivery speed calculation part 33 calculates intervals of reception in TS files (i.e. TS-reception intervals) by equation (5).

$$\text{TS-reception interval} = \text{start time of receiving TS files currently delivered} - \text{start time of receiving TS files previously received} \quad (5)$$

In equation (5), both the TS files currently received and the TS files previously received are TS files in the same HLS delivery session.

<Determination of Delivery Environment Conditions and Whether to Implement Pacing Delivery>

The delivery speed calculation part 33 sends the real delivery speed, the lower-limit threshold, the upper-limit threshold, the presumed delivery speed, and intervals of reception to the delivery environment determination part 36. The delivery environment determination part 36 determines conditions of delivery environments such as delayed conditions of networks based on the real delivery speed, the presumed delivery speed, and the thresholds concerning intervals of reception (i.e. the lower-limit threshold and the upper-limit threshold). The delivery speed determination part 34 determines the delivery speed of TS files based on the determination result of the delivery environment determination part 36.

First, the delivery environment determination part 36 compares the TS-reception interval with the lower-limit threshold and the upper-limit threshold. In addition, the delivery environment determination part 36 compares the real delivery speed with the presumed delivery speed. FIG. 5 is a table describing the relationship between combinations of comparison results and their corresponding values of delivery speed.

The delivery environment determination part 36 detects an initial buffer or a trick play when the comparison result indicates "TS-reception interval <lower-limit threshold" and "real delivery speed presumed delivery speed" with reference to the table of FIG. 5. The delivery speed determination part 34 determines the delivery speed as "full speed" when it detects an initial buffer or a trick play. Herein, the "full speed" is speed for delivering TS files without any limitation.

The delivery environment determination part 36 detects an initial buffer or a trick play when the comparison result indicates "TS-reception interval<lower-limit threshold" and "real delivery speed<presumed delivery speed" with reference to the table of FIG. 5. In this case, the delivery speed determination part 34 determines the delivery speed as "full speed".

The delivery environment determination part 36 determines that no delay occurs in initial buffer or networks when the comparison result indicates "lower-limit threshold TS-reception interval upper-limit threshold" and "real delivery speed presumed delivery speed" with reference to the table of FIG. 5. The delivery speed determination part 34 determines the delivery speed as pacing delivery speed when it determines that no delay occurs in initial buffer or networks. In this connection, the pacing delivery speed will be explained later.

The delivery environment determination part 36 determines that any delay occurs in networks when the comparison result indicates "lower-limit threshold TS-reception interval<upper-limit threshold" and "real delivery speed<presumed delivery speed" with reference to the table of FIG. 5. The deliver speed determination part 34 determines the delivery speed as full speed when the determination result of the delivery environment determination part 36 indicates any delay occurring in networks.

The delivery environment determination part 36 determines any delay occurring in networks when the comparison result indicates "TS-reception interval>upper-limit threshold" and "real delivery speed presumed delivery speed" with reference to the table of FIG. 5. The delivery speed determination part 34 determines the delivery speed as full speed when the determination result of the delivery environment determination part 36 indicates any delay occurring in networks.

The delivery environment determination part 36 determines that any delay occurs in networks when the comparison result indicates "TS-reception interval>upper-limit threshold" and "real delivery speed presumed delivery speed" with reference to the table of FIG. 5. In this case, the delivery speed determination part 34 determines the delivery speed as full speed.

In this connection, the delivery speed determination part 34 determines the delivery speed as full speed when it firstly delivers a TS file (i.e. a first TS file after initiating an HLS session).

<Calculation of Pacing Delivery Speed>

Next, the pacing delivery speed will be explained below. The delivery speed determination part 34 carries out a process of determining delivery speed suited to the bitrate selected by the client device 40. For example, the delivery speed determination part 34 determines pacing delivery speed by executing the delivery speed determination process. That is, the delivery speed determination part 34 determines the pacing delivery speed as "maximum delivery speed" or "delivery speed suited to the bitrate for contents being delivered".

(1) Maximum Delivery Speed

For example, the maximum delivery speed is a set value based on the performance and bands of network devices. By setting the maximum delivery speed, it is possible to prevent contents from being delivered at higher speed than speed adapted to other network devices. Alternatively, the maximum delivery speed may be a set value which is determined upon requesting content delivery services. In this connection, the maximum delivery speed may be higher or lower than the full delivery speed. In actuality, the maximum delivery speed would match the full delivery speed even when the maximum delivery speed is set to a larger value than the full delivery speed.

(2) Delivery Speed Suited to the Bitrate for Contents being Delivered

For example, the delivery speed determination part 34 determines the delivery speed suited to a higher band than the band for delivering TS files representing moving-picture contents. As described later with reference to FIG. 6, the procedure for determining delivery speed is not involved in audio contents. The client device 40 compares the download speed, which is determined to be suited to the bitrate requested by itself, with the actual download speed of TS files, and then it may operate to download TS files at a higher bitrate than its previous bitrate when the download speed becomes higher than the actual download speed. In addition, the repeater equipment 20 may determine delivery speed for each bitrate requested by the client device 40. The delivery speed is the speed for the client device 40 to receive divided files at its bitrate. For example, X1 represents the delivery speed for a high bitrate; X2 represents the delivery speed for an intermediate bitrate; and X3 represents the delivery speed for a low bitrate. In this case, the client device 40 requests TS files at the low bitrate, and therefore the repeater equipment 20 transmits TS files at the delivery speed X3. This may inhibit the client device 40 from receiving TS files at higher download speed than the delivery speed X3. This is because the client device 40 recognizes the delivery speed X3 as limit speed so that it cannot operate to download TS files at a higher bitrate than its previous bitrate. In other words, the client device 40 should receive TS files at the low bitrate although it can receive TS files at a higher bitrate than its original bitrate; this may degrades the client QoE (Quality of Experience). In the present embodiment, the delivery speed determination part 34 determines the delivery speed X2 suited to the intermediate bitrate higher than the low bitrate requested by the client device 40. The repeater equipment 20 delivers TS files, used for the low bitrate requested by the client device 40, at the delivery speed X2 corresponding to the intermediate bitrate. This may present the possibility of downloading TS files at the delivery speed X2 higher than the delivery speed X3 corresponding to the low bitrate requested by the client device 40 in environments causing no delay in networks. In this case, the client device 40 may request TS files at the intermediate bitrate higher than the low bitrate. This makes it possible to secure the client QoE. Thus, the pacing delivery speed would be the delivery speed corresponding to a higher bitrate than an original bitrate for TS files being delivered. In this connection, the present embodiment does not set the pacing delivery speed to the highest delivery speed (e.g. the delivery speed X1) corresponding to a further higher bitrate than the original bitrate for TS files being delivered because the excessively increased delivery speed may greatly consume bands so as to cause a traffic burst condition, which may undermine the significance of the pacing delivery.

The delivery speed determination part 34 determines the pacing delivery speed as appropriate one of "maximum delivery speed" and "delivery speed suited to the bitrate for contents being delivered". For example, the delivery speed determination part 34 calculates the "delivery speed suited to the bitrate for contents being delivered" and compares it with the "maximum delivery speed". In the case of "delivery speed suited to a playlist being delivered" 5"maximum delivery speed", for example, the delivery speed determination part 34 determines the pacing delivery speed as the delivery speed suited to a playlist being delivered. In the case of "delivery speed suited to a playlist being delivered">"maximum delivery speed", the delivery speed determination part 34 determines the pacing delivery speed as the maximum delivery speed. Thus, the repeater equipment 20 can deliver contents at the delivery speed as requested by the client device 40.

Figure 6:
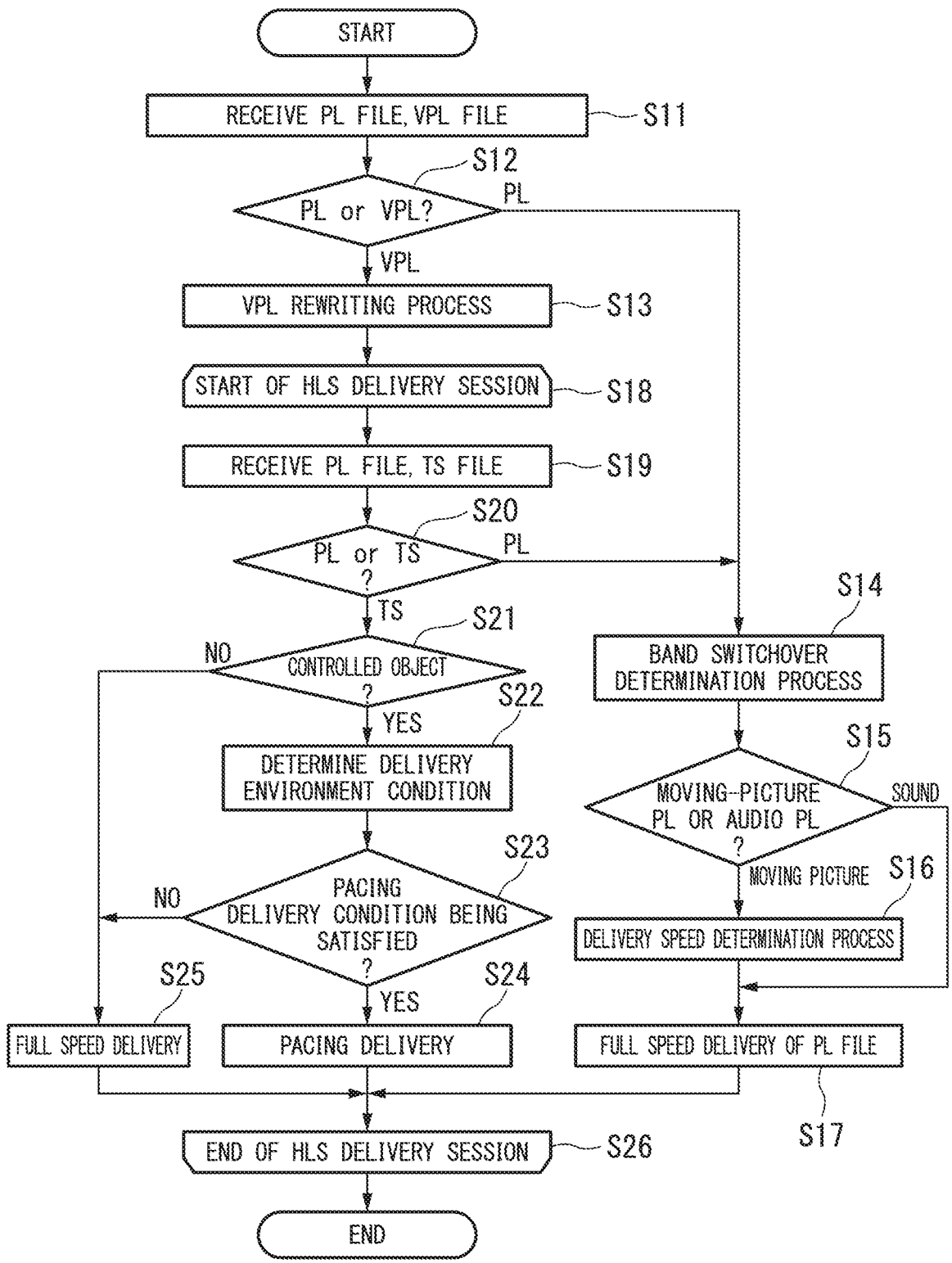
FIG. 6 is a flowchart showing an example of a delivery control process executed by the delivery control device and the repeater equipment.

Next, the process for the repeater equipment 20 to deliver contents at appropriate delivery speed will be described with reference to the flowchart of FIG. 6. FIG. 6 is a flowchart showing an example of a delivery process executed by the repeater equipment 20 and the delivery control device 30.

First, the receiver 21 of the repeater equipment 20 receives a PL file and/or a VPL file concerning a content requested by the client device 40 from the content delivery server device 10 (step S11). The receiver 21 sends the received file to the file retrieval part 31. The file retrieval part 31 sends its retrieved file to the file analysis part 32. The file analysis part 32 determines whether the retrieved file is a PL file or a VPL file (step S12). Specifically, the file analysis part 32 refers to the "EXT-X-STREAM-INF" tag of the retrieved file so as to determine the retrieved file as the PL file when the tag describes the "BANDWIDTH" attribute or to determine the retrieved file as the VPL file when the tag does not describe the "BANDWIDTH" attribute. The file analysis part 32 carries out a VPL rewriting process (step S13) when it determines the retrieved file as the VPL file. Specifically, the file analysis part 32 analyzes the VPL file so as to read the bitrate described in the VPL file. The file analysis part 32 compares the delivery speed for each bitrate with the upper-limit value of network bands (e.g. the maximum delivery speed). In addition, the file analysis part 32 compares the bandwidth for content delivery designated by an operator with the delivery speed corresponding to the bitrate described in the VPL file. All the delivery speed for each bitrate, the upper-limit value of network bands, and the bandwidth for content delivery designated by an operator have been stored on a storage unit (not shown) of the delivery control device 30 in advance. When the delivery speed corresponding to the bitrate exceeds the upper-limit value of network bands or the bandwidth designated by an operator, the file analysis part 32 deletes the information of the PL file (e.g. the URL of the PL file) concerning the bitrate from the VPL file. However, the file analysis part 32 does not delete the information of the PL file when the information of the PL file concerning the bitrate satisfying the bandwidth designated by an operator may be no longer described in the VPL file after deletion of the information of the PL file. Then, the repeater equipment 20 sends the rewritten VPL file to the client device 40, and therefore the client device 40 may not recognize the existence of TS files having the bitrate above the upper-limit value of network bands. Therefore, the client device 40 would not request TS files having a higher bitrate, thus preventing excessively consuming network bands than necessary. In addition, the delivery control device 30 deletes the PL file from the VPL file such that at least one piece of information of the PL file having the bandwidth designated by an operator will be included in the VPL file. Thus, it is possible to guarantee the quality of contents delivered to the client device 40 through the repeater equipment 20, and therefore it is possible to suppress a reduction of QoE not intended by an operator. In addition, it is possible for the client device 40 to prevent interruption in receiving TS files concerning contents to be viewed by a client. For example, the VPL file rewriting process may be carried out only when congestion occurs in networks or only when the amount of network bands is insufficient. Thus, it is possible for the client device 40 to receive TS files at a high bitrate when the amount of network bands is sufficient, and therefore a client can view contents at high quality.

When the file analysis part 32 determines the retrieved file as the PL file, the file analysis part 32 carries out a band switchover determination process (steps S14, S15). In the band switchover determination process, the file analysis part 32 determines whether the PL file is an audio PL file solely describing URLs of TS files for audio contents or a moving-picture PL file describing URLs of TS files for moving-picture contents. In the case of the TILS, for example, the file analysis part 32 analyzes the VPL file so as to determine the PL file as an audio PL file when the VPL file describes a tag or a tag attribute solely identifying an audio content while a tag indicated by the URI of the retrieved PL file matches the tag attribute. On the other hand, the file analysis part 32 determines the PL file as a moving-picture PL file when the retrieved PL file is not an audio PL file or when the PL file does not includes the VPL file. When the file analysis part 32 determines the retrieved PL file as an audio PL file, the processing goes to step S17 from step S15.

The delivery speed determination part 34 carries out the delivery speed determination process (step S16) when the file analysis part 32 determines the retrieved PL file as a moving-picture PL file. The delivery speed determination process has been described with reference to the table of FIG. 5. For example, the delivery speed determination part 34 determines the delivery speed by reading the delivery speed corresponding to a higher bitrate than the original bitrate of the retrieved PL file from a storage unit (not shown). The delivery speed determination part 34 compares the determined delivery speed with the maximum delivery speed. In the case of "delivery speed >maximum delivery speed", it is possible to determine new delivery speed as the maximum delivery speed. The delivery speed determination part 34 stores the determined delivery speed on the storage unit.

Next, the delivery speed determination part 34 instructs the transmitter 23 of the repeater equipment 20 to transmit PL files to the client device 40 at full speed. Thus, the transmitter 23 transmits PL files to the client device 40 at full speed (step S17). The client device 40 retrieves a PL file so as to sequentially download TS files by accessing URLs described in the PL file. That is, the delivery control device 30 determines the delivery speed for TS files, and therefore the repeater equipment 20 delivers TS files to the client device 40 at the delivery speed determined by the delivery control device 30.

Next, the process of the repeater equipment 20 to deliver TS files at the delivery speed determined by the delivery control device 30 will be described below. An HLS delivery session is initiated when the client device 40 starts to download a first TS file (step S18). The client device 40 requests TS files or PL files. The client device 40 sequentially requests TS files in the period that the bitrate of TS files is unchanged. The client device 40 may request TS files at a higher bitrate as the content delivery speed becomes higher. In this case, the client device 40 requests PL files corresponding to a higher bitrate. After the initiation of an HLS session, the receiver 21 of the repeater equipment 20 receives TS files or PL files as requested by the client device 40 (step S19). The receiver 21 stores the received TS files or received PL files on the storage unit 22. In addition, the receiver 21 sends the received files to the file retrieval part 31. The file retrieval part 31 sends the retrieved files to the file analysis part 32. The file analysis part 32 determined whether the retrieved file is a TS file or a PL file (step S20). Specifically, the file analysis part 32 analyzes a certain size of data extracted from the top portion of the retrieved file so as to determine whether or not the retrieved file according to the file format is a TS file. The foregoing steps S14 through S17 are executed when the file analysis part 32 determines that the retrieved file is a PL file. On the other hand, a series of steps S21 through S26, which will be described later, are executed when the file analysis part 32 determines that the retrieved file is a TS file.

First, the file analysis part 32 determines whether or not the retrieved TS file is a controlled object (step S21). Herein, the TS file as a controlled object indicates a moving-picture TS file concerning a moving picture, and it is a second or subsequent TS file. In the case of the first TS file after initiation of an HLS delivery session, for example, the processing goes to step S25. In the case that the retrieved TS file is an audio TS file concerning a sound-only content, the processing goes to step S25. An example of a process for determining whether or not the retrieved TS file is an audio TS file will be described below. The file analysis part 32 analyzes whether a tag or a tag attribute discriminating a sound-only content is described in a VPL file. When a tag attribute discriminating a sound-only content is described in a VPL file, the file analysis part 32 determines the retrieved TS file as an audio TS file when the tag attribute matches an attribute indicated by the URL of a PL file describing the retrieved TS file.

Next, the delivery environment determination part 36 determines a delivery environment condition (step S22). The operation to detect a delivery environment has been described with reference to the table of FIG. 5. That is, the delivery speed calculation part 33 calculates the real delivery speed, the lower-limit threshold and the upper-limit threshold for the TS-reception interval, the presumed delivery speed, and the interval of receiving TS files so as to send those values to the delivery environment determination part 36. The delivery environment determination part 36 determines delayed conditions of networks and presence/absence of an initial buffer or a trick play based on those values according to the determination criterion shown by the table of FIG. 5.

Next, the delivery speed determination part 34 determines whether or not a delivery environment meets a pacing delivery condition based on the determination result of the delivery environment determination part 36 (step S23). When the deliver environment determination part 36 determines that an initial buffer or a trick play occurs, for example, the delivery speed determination part 34 determines that the delivery environment does not meet the pacing delivery condition. In addition, when the deliver environment determination part 36 determines that any delay in networks occurs, the delivery speed determination part 34 determines that the delivery environment does not meet the pacing delivery condition. In other cases, the delivery speed determination part 34 determines that the delivery environment meets the pacing delivery condition.

When the delivery speed determination part 34 determines that the delivery environment meets the pacing delivery condition, the repeater equipment 20 carries out pacing delivery for TS files (step S24). Specifically, the delivery speed determination part 34 reads delivery speed stored on a storage unit in step S16. Next, the delivery speed determination part 34 instructs the transmitter 23 to transmit TS files at the delivery speed read from the storage unit. Next, the transmitter 23 reads TS files from the storage unit 22 so as to transmit TS files to the client device 40 at the delivery speed instructed by the delivery speed determination part 34.

When the delivery environment does not meet the pacing delivery condition, the repeater equipment 20 delivers TS files to the client device 40 at full speed (step S25). Specifically, the delivery speed determination part 34 instructs the transmitter 23 to transmit TS files at full speed. Next, the transmitter 23 reads TS files from the storage unit 22 so as to transmit TS files to the client device 40 at full speed. Thereafter, the repeater equipment 20 and the delivery control device 30 repeats a series of steps S19 through S25 until termination of an HLS session due to completion of viewing contents with the client device 40 by a client (step S26).

Figure 7:
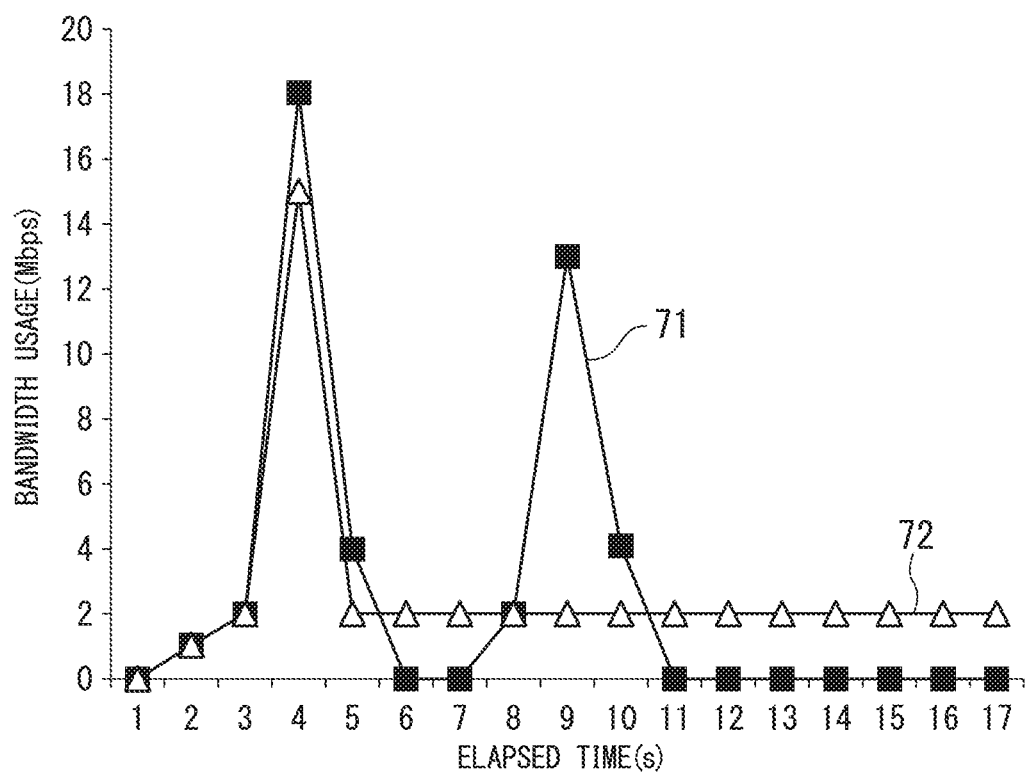
FIG. 7 is a graph showing the temporal transition of network band usage in content delivery conducted between a client device and the repeater equipment installing the delivery control method of the present invention therein.

Next, an effect of the delivery control method according to the embodiment of the present invention will be described with reference to a graph of FIG. 7. FIG. 7 is a graph showing the temporal transition of network band usage in content delivery conducted between the client device 40 and the repeater equipment 20 installing the delivery control method of the present invention. In FIG. 7, the vertical axis represents network band usage (Mbps) while the horizontal axis represents elapsed time after content delivery (second). Herein, a graph 71 shows the temporal transition of network band usage in the situation not adopting the delivery control method of the present embodiment while a graph 72 shows the temporal transition of network band usage in the situation adopting the delivery control method of the present invention. According to comparison between the graphs 71 and 72, it is possible to smooth network band usage for content delivery by installing the delivery control method of the present embodiment in the repeater equipment 20. Thus, it is possible to delivery TS files from the repeater equipment 20 to the client device 40 without any delay; hence, a client may smoothly view contents. The graph 71 apparently shows unexpected increases in network band usage, but the graph 72 according to the present embodiment can suppress unexpected increases in network band usage; hence, it is possible to prevent exhaustion of bands in networks.

In general, the ABR delivery method does not adopt the pacing delivery, and therefore it may carry out burst data transfer instantaneously when the content delivery server device 10 delivers TS files. In contrast, the present embodiment applies the pacing delivery to the ABR delivery method, and therefore it is possible to smoothly carry out data transfer without causing burst data transfer.

In order to suppress traffic without sacrificing reproduction quality of contents, it is necessary to determine whether or not to adopt pacing delivery by a client based on buffer storage conditions. In the ABR delivery method conducting content delivery using segment files (e.g. TS files), however, it is likely that traffic may not be reduced as expected or that reproduction wait time may increase or reproduction suspension may occur since the repeater equipment 20 cannot precisely detect the buffered condition of the client device 40. The present embodiment is designed to measure intervals of receiving segment files according to the ABR delivery method, to compare intervals of reception with a threshold calculated based on the reproduction time of each segment file, to estimate the buffered condition of the client device 40 and the delayed condition of networks, and to thereby deliver TS files at the deliver speed suited to those conditions. Thus, it is possible to enhance the effect of the pacing delivery. In addition, the present embodiment is able to delivery segment files at the delivery speed suited to segment files having a larger amount of information (or a higher bitrate) than the amount of information of segment files requested by the client device 40. Thus, it is possible to compensate for client QoE.

In addition, VPL files may describe information showing the existence of contents having multiple bitrates. When a VPL file describes three types of information concerning three bitrates such as 1 Mbps, 512 Kbps, and 256 Kbps, for example, the client device 40 may selects a content having the bitrate of 1 Mbps. According to the present embodiment conducting the VPL-file rewriting process for setting the upper limit of bitrate to 700 Kbps, for example, when a VPL file is rewritten and transferred to the client device 40, the client device 40 may inevitably select one of two bitrates for contents such as 512 Kbps and 256 Kbps. Assuming that the client device 40 selects the bitrate of 512 Kbps, the amount of data transfer will be halved compared to the bitrate of 1 Mbps. According to the present embodiment, it is possible to reduce the possibility of suppressing bands used for other users. In result, it is possible to improve QoE for many users. It is possible to change whether or not to adopt the aforementioned delivery speed control function depending on time zones, and it is possible to apply the delivery speed control function to a specific terminal alone. Thus, it is possible to further enhance the effect of improving QoE by freely adjusting combinations as to whether or not to adopt the delivery speed control function for each time zone or for each terminal.

The aforementioned delivery control device 30 includes a computer system therein. In addition, the foregoing processes of the delivery control device 30 are stored as programs on computer-readable storage media; hence, it is possible for a computer to carry out the foregoing functions by reading and executing programs from storage media. For example, computer-readable storage media refer to magnetic disks, magneto-optic disks, CD-ROM, DVD-ROM, semiconductor memory, etc. Moreover, it is possible to delivery programs to a computer through communication lines, and therefore the computer may execute those programs.

The foregoing programs may realize part of the foregoing embodiments. Alternatively, the foregoing programs may be so-called differential files (or differential programs) combinable with pre-installed programs of a computer system to achieve the foregoing functions.

The entirety or part of the foregoing functionality of the delivery control device 30 can be realized using hardware such as ASIC (Application Specific Integrated Circuit), PLD (Programmable Logic Device), and FPGA (Field Programmable Gate Array).

Lastly, it is possible to replace the constitution elements of the foregoing embodiment with other known constituent elements within a range not departing from the subject matter of the present invention. The present invention is not necessarily limited to the foregoing embodiment; hence, the present embodiment may embrace variations and modifications within the scope of the invention as defined by the appended claims. In interpretation of claims, for example, the file analysis part 32 is one example of a content retrieval destination information rewriting part; a PL file is an example of list information; and a VPL file is an example of parent list information.

INDUSTRIAL APPLICABILITY

The present invention is designed to control content delivery speed by applying pacing delivery to the ABR (Adaptive Bit Rate) delivery method depending on delayed conditions of networks and operating conditions of client devices, however, the present invention is applicable to other delivery methods.

REFERENCE SIGNS LIST 1 content delivery system
10 content delivery server device
20 repeater equipment
21 receiver
22 storage unit
23 transmitter
30 delivery control device
31 file retrieval part
32 file analysis part
33 delivery speed calculation part
34 delivery speed determination part
35 delivery speed switchover determination part
36 delivery environment determination part
40 client device

The invention claimed is:

1. A delivery control device, comprising:
a delivery speed calculation part configured to calculate a real delivery speed for sequentially delivering divided files, which are produced by dividing file data representing contents to be delivered to a client device, in an order of reproducing the contents; and
a delivery speed determination part configured to determine a delivery speed for the divided files based on the real delivery speed calculated by the delivery speed calculation part, a presumed delivery speed determined in advance, and predetermined thresholds relating to intervals of receiving the divided files.

2. The delivery control device according to claim 1, further comprising a content retrieval destination information rewriting part configured to delete list information from parent list information, which includes retrieval positions for the list information describing a list of the divided files of the contents, when a delivery speed ascribed to a bitrate described in the parent list information exceeds a predetermined delivery speed ascribed to a bandwidth used to deliver content through a network.

3. The delivery control device according to claim 1, wherein when the client device selectively receives the divided files having a specific reproduction quality among a plurality of divided files having different reproduction qualities for the contents, the delivery speed determination part determines the delivery speed for the divided files actually received as speed of selectively receiving the divided files having a higher reproduction quality than an original reproduction quality for the client device to actually receive the divided files.

4. The delivery control device according to claim 3, wherein, when audio contents are delivered to the client device, the delivery speed determination part determines a full delivery speed, which is determined in advance, without determining the delivery speed suited to the reproduction quality for the client device to receive the divided files.

5. The delivery control device according to claim 1, further comprising a delivery environment determination part configured to determine an operating condition relating to a network used to deliver the contents or the client device for receiving the contents, wherein the delivery speed determination part determines the delivery speed for the divided files based on a determination result of the delivery environment determination part.

6. The delivery control device according to claim 5, wherein the delivery speed determination part determines a full delivery speed which is determined in advance when the delivery environment determination part detects at least one of any delay occurring in the network, a start timing of receiving the contents with the client device, and a jump operation for changing a reproduction position of the contents.

7. The delivery control device according to claim 1, which is installed in a repeater equipment interposed between a content delivery server device and the client device.

8. A content delivery system, comprising:
a content delivery server device;
a client device; and
the delivery control device according to claim 1, which is installed in a repeater equipment interposed between the content delivery server device and the client device.

9. A delivery control method, comprising:
calculating a real delivery speed for sequentially delivering divided files, which are produced by dividing file data representing contents to be delivered to a client device, in an order of reproducing the contents; and
determining a delivery speed for the divided files based on the calculated real delivery speed, a presumed delivery speed determined in advance, and predetermined thresholds relating to intervals of receiving the divided files.

10. A non-transitory computer-readable storage medium having stored thereon a program that, upon execution by a computer, causes the computer to execute:
a first process for calculating a real delivery speed for sequentially delivering divided files, which are produced by dividing file data representing contents to be delivered to a client device, in an order of reproducing the contents; and
a second process for determining a delivery speed for the divided files based on the calculated real delivery speed, a presumed delivery speed determined in advance, and predetermined thresholds relating to intervals of receiving the divided files.

11. The delivery control device according to claim 2, which is installed in a repeater equipment interposed between a content delivery server device and the client device.

12. The delivery control device according to claim 3, which is installed in a repeater equipment interposed between a content delivery server device and the client device.

13. The delivery control device according to claim 4, which is installed in a repeater equipment interposed between a content delivery server device and the client device.

14. The delivery control device according to claim 5, which is installed in a repeater equipment interposed between a content delivery server device and the client device.

15. The delivery control device according to claim 6, which is installed in a repeater equipment interposed between a content delivery server device and the client device.

16. A content delivery system, comprising:
a content delivery server device;
a client device; and
the delivery control device according to claim 2, which is installed in a repeater equipment interposed between the content delivery server device and the client device.

17. A content delivery system, comprising:
a content delivery server device;
a client device; and
the delivery control device according to claim 3, which is installed in a repeater equipment interposed between the content delivery server device and the client device.

18. A content delivery system, comprising:
a content delivery server device;
a client device; and
the delivery control device according to claim 4, which is installed in a repeater equipment interposed between the content delivery server device and the client device.

19. A content delivery system, comprising:
a content delivery server device;
a client device; and
the delivery control device according to claim 5, which is installed in a repeater equipment interposed between the content delivery server device and the client device.

20. A content delivery system, comprising:
a content delivery server device;
a client device; and
the delivery control device according to claim 6, which is installed in a repeater equipment interposed between the content delivery server device and the client device.

* * * * *